US009363200B2

(12) United States Patent
Kasztenny et al.

(10) Patent No.: US 9,363,200 B2
(45) Date of Patent: *Jun. 7, 2016

(54) TRANSMISSION OF DATA OVER A LOW-BANDWIDTH COMMUNICATION CHANNEL

(71) Applicant: Schweitzer Engineering Laboratories, Inc., Pullman, WA (US)

(72) Inventors: Bogdan Z. Kasztenny, Markham (CA); Timothy P. Tibbals, Nordland, WA (US); David J. Dolezilek, Pullman, WA (US); Benjamin S. Day, Pullman, WA (US); Ryan Bradetich, Pullman, WA (US); Jerry J. Bennett, Pullman, WA (US); Shankar V. Achanta, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/763,474

(22) PCT Filed: Feb. 18, 2014

(86) PCT No.: PCT/US2014/016955
§ 371 (c)(1),
(2) Date: Jul. 24, 2015

(87) PCT Pub. No.: WO2014/149309
PCT Pub. Date: Sep. 25, 2014

(65) Prior Publication Data
US 2015/0358253 A1 Dec. 10, 2015

(51) Int. Cl.
*H04L 27/28* (2006.01)
*H04L 12/927* (2013.01)
(Continued)

(52) U.S. Cl.
CPC ............... *H04L 47/805* (2013.01); *H04B 3/54* (2013.01); *H04L 43/106* (2013.01); *H04L 45/30* (2013.01);
(Continued)

(58) Field of Classification Search
CPC ..... H04L 47/805; H04L 43/106; H04L 69/08; H04B 3/54
See application file for complete search history.

(56) References Cited

U.S. PATENT DOCUMENTS

| 4,054,949 A | 10/1977 | Takezoe |
| 4,535,306 A | 8/1985 | Yamaguchi |

(Continued)

FOREIGN PATENT DOCUMENTS

| GB | 2278519 | 11/1994 |
| JP | 10247377 | 9/1998 |

(Continued)

OTHER PUBLICATIONS

PCT/US2014/016955 Patent Cooperation Treaty, International Search Report and Written Opinion of the International Searching Authority, Jun. 5, 2014.

(Continued)

*Primary Examiner* — Dac Ha
(74) *Attorney, Agent, or Firm* — John P. Davis; Richard M. Edge

(57) ABSTRACT

Disclosed herein are various systems and methods that may improve the transmission of data over low-bandwidth communication channels in an electric power delivery system. Devices communicating across a low-bandwidth communication channel may implement several approaches, according to various embodiments disclosed herein, to reduce the data transmitted across the low-bandwidth communication channel and to prioritize the transmission of time-sensitive and/or more important information with respect to other data. Various embodiments disclosed herein may inspect packets to be transmitted across a low-bandwidth communication channel in order to identify high priority data. High priority data may be time-sensitive information, and accordingly, transmission of such data may be prioritized over other data in order to reduce transmission latency of the higher priority data.

15 Claims, 7 Drawing Sheets

(51) Int. Cl.
- *H04L 12/725* (2013.01)
- *H04B 3/54* (2006.01)
- *H04L 12/26* (2006.01)
- *H04L 29/06* (2006.01)
- *H04W 72/00* (2009.01)
- *H04W 28/02* (2009.01)
- *H04L 12/859* (2013.01)

(52) U.S. Cl.
CPC ............ *H04L 47/2475* (2013.01); *H04L 69/08* (2013.01); *H04W 28/02* (2013.01); *H04W 72/00* (2013.01)

(56) References Cited

U.S. PATENT DOCUMENTS

| | | | |
|---|---|---|---|
| 4,546,486 A | 10/1985 | Evans | |
| 4,768,178 A | 8/1988 | Conklin | |
| 4,808,884 A | 2/1989 | Hull | |
| 5,103,466 A | 4/1992 | Bazes | |
| 5,235,590 A | 8/1993 | Taguchi | |
| 5,363,377 A | 11/1994 | Sharpe | |
| 5,596,263 A | 1/1997 | Zavis | |
| 5,630,757 A | 5/1997 | Gagin | |
| 5,699,367 A | 12/1997 | Haartsen | |
| 5,793,869 A | 8/1998 | Claflin | |
| 6,456,831 B1 | 9/2002 | Tada | |
| 6,535,925 B1 | 3/2003 | Svanbro | |
| 6,577,628 B1 | 6/2003 | Hejza | |
| 6,608,841 B1 | 8/2003 | Koodli | |
| 6,678,134 B2 | 1/2004 | Sugiura | |
| 6,751,209 B1 | 6/2004 | Hamiti | |
| 6,754,210 B1 | 6/2004 | Ofek | |
| 6,847,691 B2 | 1/2005 | Torikoshi | |
| 6,859,742 B2 | 2/2005 | Randall | |
| 6,891,441 B2 | 5/2005 | Rochow | |
| 6,937,683 B1 | 8/2005 | Ratzel | |
| 6,947,269 B2 | 9/2005 | Lee | |
| 6,973,085 B1 | 12/2005 | Acharya | |
| 7,239,581 B2 | 7/2007 | Delgado | |
| 7,272,201 B2 | 9/2007 | Whitehead | |
| 7,283,568 B2 | 10/2007 | Robie | |
| 7,463,467 B2 | 12/2008 | Lee | |
| 7,571,216 B1 | 8/2009 | Mcrae | |
| 7,617,408 B2 | 11/2009 | Frazier | |
| 7,664,869 B2 * | 2/2010 | Baker | G05B 19/05 709/217 |
| 7,701,683 B2 | 4/2010 | Morris | |
| 8,082,367 B2 * | 12/2011 | Etheridge | H04J 3/0682 370/507 |
| 8,351,433 B2 | 1/2013 | Morris | |
| 8,578,012 B2 * | 11/2013 | Bradetich | G05B 19/4185 709/223 |
| 8,793,767 B2 * | 7/2014 | Schweitzer, III | G06F 21/606 709/229 |
| 8,819,512 B1 | 8/2014 | Wang | |
| 9,065,763 B2 | 6/2015 | Kasztenny | |
| 2001/0023464 A1 | 9/2001 | Deck | |
| 2002/0069299 A1 | 6/2002 | Rosener | |
| 2002/0080808 A1 | 6/2002 | Leung | |
| 2003/0195975 A1 * | 10/2003 | Papadopoulos | G05B 19/05 709/230 |
| 2003/0204756 A1 | 10/2003 | Ransom | |
| 2004/0138786 A1 | 7/2004 | Blackett | |
| 2004/0138834 A1 | 7/2004 | Blackett | |
| 2004/0148552 A1 | 7/2004 | Matsumoto | |
| 2004/0196855 A1 | 10/2004 | Davies | |
| 2004/0213214 A1 | 10/2004 | Jung | |
| 2005/0025105 A1 | 2/2005 | Rue | |
| 2005/0085279 A1 | 4/2005 | Aoki | |
| 2005/0160184 A1 | 7/2005 | Walsh | |
| 2006/0029105 A1 | 2/2006 | Kasztenny | |
| 2006/0123119 A1 | 6/2006 | Hill | |
| 2007/0002746 A1 | 1/2007 | Shankar | |
| 2007/0058320 A1 | 3/2007 | Lee | |
| 2007/0096942 A1 | 5/2007 | Kagan | |
| 2007/0127487 A1 | 6/2007 | Kim | |
| 2007/0147415 A1 | 6/2007 | Marusca | |
| 2007/0252724 A1 | 11/2007 | Donaghey | |
| 2007/0291780 A1 | 12/2007 | Smith | |
| 2008/0005484 A1 | 1/2008 | Joshi | |
| 2008/0068291 A1 | 3/2008 | Yuan | |
| 2008/0071482 A1 | 3/2008 | Zweigle | |
| 2008/0101251 A1 | 5/2008 | Casebolt | |
| 2008/0127210 A1 | 5/2008 | Bosold | |
| 2008/0188264 A1 | 8/2008 | Duan | |
| 2008/0189784 A1 | 8/2008 | Mangione-Smith | |
| 2008/0192635 A1 | 8/2008 | Usuda | |
| 2008/0219186 A1 | 9/2008 | Bell | |
| 2008/0235355 A1 | 9/2008 | Spanier | |
| 2009/0052392 A1 | 2/2009 | Sumasu | |
| 2009/0141727 A1 | 6/2009 | Brown | |
| 2009/0160189 A1 | 6/2009 | Rasmussen | |
| 2009/0180477 A1 | 7/2009 | Akahane | |
| 2009/0254655 A1 | 10/2009 | Kidwell | |
| 2009/0260083 A1 | 10/2009 | Szeto | |
| 2009/0300165 A1 | 12/2009 | Tuckey | |
| 2009/0319904 A1 | 12/2009 | Rensin | |
| 2010/0020773 A1 | 1/2010 | Jechoux | |
| 2010/0054164 A1 | 3/2010 | Lucani | |
| 2010/0104044 A1 | 4/2010 | Kishigami | |
| 2010/0142560 A1 | 6/2010 | Sharivker | |
| 2010/0182952 A1 | 7/2010 | Jeong | |
| 2010/0195763 A1 | 8/2010 | Lee | |
| 2010/0215004 A1 | 8/2010 | Yoo | |
| 2010/0251134 A1 | 9/2010 | Van Seggelen | |
| 2010/0275086 A1 | 10/2010 | Bergquist | |
| 2011/0022666 A1 | 1/2011 | Pinto | |
| 2011/0069709 A1 | 3/2011 | Morris | |
| 2011/0069718 A1 | 3/2011 | Morris | |
| 2012/0005326 A1 | 1/2012 | Bradetich | |
| 2012/0078555 A1 | 3/2012 | Banhegyesi | |
| 2012/0082048 A1 | 4/2012 | Taft | |
| 2012/0155458 A1 | 6/2012 | Larson | |
| 2012/0195309 A1 | 8/2012 | Okuda | |
| 2012/0215479 A1 | 8/2012 | Pamulaparthy | |
| 2012/0278421 A1 | 11/2012 | Sun | |
| 2013/0018521 A1 | 1/2013 | Manson | |
| 2013/0039266 A1 | 2/2013 | Ekici | |
| 2013/0091258 A1 | 4/2013 | Shaffer | |
| 2013/0117755 A1 | 5/2013 | Bontempi | |
| 2013/0142336 A1 | 6/2013 | Fries | |
| 2014/0025321 A1 | 1/2014 | Spanier | |
| 2014/0195844 A1 | 7/2014 | Laval | |
| 2014/0269736 A1 | 9/2014 | Kasztenny | |

FOREIGN PATENT DOCUMENTS

| | | |
|---|---|---|
| JP | 2001221871 | 8/2001 |
| JP | 2001221874 | 8/2001 |
| WO | 0016525 | 3/2000 |
| WO | 0057527 | 9/2000 |
| WO | 2005088911 | 9/2005 |

OTHER PUBLICATIONS

Roy Moxley, Ken Fodero, and Hector J. Altuve, Updated Transmission Line Protection Communications, IEEE, Oct. 2008.

James W. Rice, Sam Fulford, and Nicholas C. Seeley, Improved Service Reliability for Rural Electric Customers—Innovative Auto-Restoration Following Loss of Primary Source Interconnection, Sep. 2006.

Nicholas C. Seeley, Automation at Protection Speeds: IEC 61850 GOOSE Messaging as a Reliable, High-Speed Alternative to Serial Communications, Feb. 2008.

S. Ward, W. Higinbotham, E. Duvelson, Inside the Cloud—Network Communications Basics for the Relay Engineer, 34th Annual Western Protective Relay Conference, Oct. 2007.

PCT/US2010/049169 Patent Cooperation Treaty Notification of Transmittal of the International Search Report and the Written Opinion, International Search Report, and Written Opinion, Nov. 5, 2010.

D.L. Mills, Experiments in Network Clock Synchronization, Network Working Group Request for Comments: 957, Sep. 1985.

(56) References Cited

OTHER PUBLICATIONS

D. Mills, Simple Network Time Protocol (SNTP) Version 4 for IPv4, IPv6, and OSI, Network Working Group Request for Comments: 4330, Jan. 2006.

Daqing Hou, Dave Dolezilek, IEC 61850—What It Can and Cannot Offer to Traditional Protection Schemes, Sep. 2008.

PCT/US2011/039498 Patent Cooperation Treaty, International Search Report and Written Opinion of the International Searching Authority, Oct. 21, 2011.

W. Kleinebreg, ABB Switzerland Ltd., Hirschmann Automation & Control GmbH, IEC 61850 Modeling of Switches, Dec. 2009.

PCT/US2014/023169 Patent Cooperation Treaty, International Search Report and Written Opinion of the International Searching Authority, Aug. 19, 2014.

Fateri, Sina, et al. "Design and Analysis of Multicast-Based Publisher/Subscriber Models over Wireless Platforms for Smart Grid Communications." Trust, Security and Privacy in Computing and Communications (TrustCom), 2012 IEEE 11th International Conference on. IEEE, 2012.

Maheswaran, O., A. Kavitha Lakshmi, and R. Malarvizhi. "Guidelines for specification and evaluation of substation automation projects based on IEC 61850." CIGRE India Journal 1.1 (2012): 30-35.

Brantley, Robert, Jacobus Theron, and Eric Udren. "The Application of IEC® 61850 to Replace Auxilliary Devices Including Lockout Relays." 60th Annual Georgia Tech Protective Relaying Conference May 2006.

Xyngi., and M. Popov. "IEC61850 overview—where protection meets communication." (2010): 46-46.

Smith, T., J. Vico, and Craig Wester. "Advanced distribution reclosing using wireless communications." Rural Electric Power Conference (REPC), 2011 IEEE. IEEE, 2011.

Ozansoy, Cagil R., Aladin Zayegh, and Akhtar Kalam. "The real-time publisher/subscriber communication model for distributed substation sustems." Power Delivery, IEEE Transactions on 22.3 (2007): 1411-1423.

Bill Lichtensteiger, Branko Bjelajac, Christian Muller, Christian Wietfeld. "RF Mesh Systems for Smart Metering: System Architecture and Performance", Smart Grid Communications, IEEE, Oct. 2010.

\* cited by examiner

TRANSMISSION OF DATA OVER A LOW-BANDWIDTH COMMUNICATION CHANNEL

RELATED APPLICATIONS

This application is the United States national stage under 35 U.S.C. §371 of International Application No. PCT/US2014/016955, filed on 18 Feb. 2014, which claimed priority to U.S. patent application Ser. No. 13/838,437, filed on 15 Mar. 2013. The entirety of these applications is incorporated by reference herein.

TECHNICAL FIELD

This disclosure relates to systems and methods for managing communication between devices in an electric power generation and delivery system, and more particularly, to systems and methods for improving the transmission of data over low-bandwidth communication channels.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
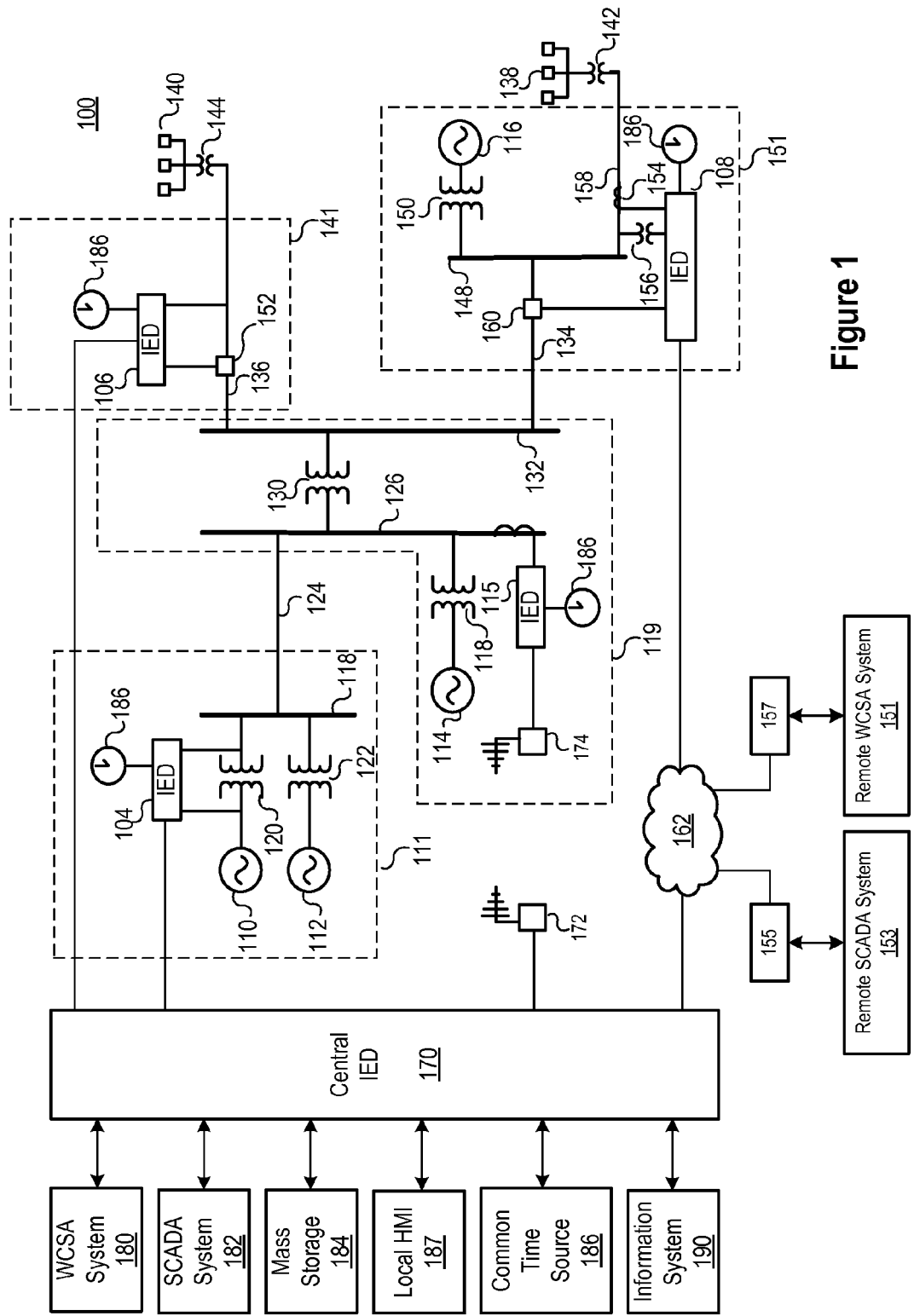
FIG. 1 illustrates a simplified one-line diagram of an electric power delivery system and associated intelligent electronic devices (IEDs) consistent with certain embodiments disclosed herein.

Electric power delivery systems may include electric power generation, transmission, and distribution equipment and loads that consume the electric power. For example, such systems include various types of equipment such as generators, transformers, circuit breakers, switches, distribution lines, transmission lines, buses, capacitor banks, reactors, loads, and the like. A purpose of electric power delivery systems is to generate and deliver usable electric power to an end user or load. Often, the generation sites are located at great distances from an end user or load. Generated electric power is typically at a relatively low voltage, but is transformed into a relatively high voltage before entering a transmission system. The voltage is again reduced for the distribution system, and often reduced yet again before ultimate delivery to the end user or load. The electric power may be monitored and controlled at various stages in the delivery system. Intelligent electronic devices (IEDs) are often used to collect electric power system information, make control and/or protection decisions, take control, automation, and/or protection actions, and/or monitor the electric power delivery system.

IEDs within an electric power delivery system may be interconnected by a variety of technologies and may utilize various communication protocols. In some circumstances, IEDs may be connected via low-bandwidth communication channels, such as network radios. Low-bandwidth channels may create communication bottlenecks that result in delayed or lost messages.

IEC 61850 GOOSE (Generic Object Oriented Substation Events) is a flexible method for signaling and data sharing over an Ethernet network; however, this flexibility may result in inefficient bandwidth utilization. Where the GOOSE protocol is used to communicate across a low-bandwidth communication channel, inherent redundancy in the communications protocol may tax an already limited communications link between two devices in an electric power delivery system. Conventional methods to minimize impact on low-bandwidth channels include reducing the size of the payload and or reducing the frequency of message repetition. These in turn cause a reduction in useable data being transmitted and longer time between messages which reduces the value of its use as a channel heartbeat. As a result, GOOSE may perform poorly when implemented across a low-bandwidth channel, such as a radio communications channel.

Certain communication protocols, including GOOSE, may exacerbate data communications problems by transmitting multiple redundant copies of a message. Transmitting the same or similar messages in a message stream may introduce a degree of dependability, helping to ensure that subscribing devices eventually receive messages. The increased network load associated with transmitting a particular message multiple times, however, may cause communication bottlenecks, thereby causing certain messages to be lost or delayed. IEDs may publish multi-cast messages until data within the message payload changes. In certain embodiments, a state number associated with the message may represent a change in the message payload, and an incrementing sequence number associated with the message may indicate a number of messages that have been published reflecting a present data state. When the message payload changes (e.g., a data state and/or a state change), the state number may be incremented to reflect a new data state and the sequence number may be reset.

Some communications between IEDs, monitored equipment, and/or network devices may be more urgent and/or important than other communications. For example, control data or real time samples used in monitoring, controlling, automating, and/or protecting an electric power generation and delivery system or its components may be particularly valuable for a certain period of time. In other words, such values have a high time sensitivity, and if such time-sensitive data is not communicated promptly, its value may be diminished. Similarly, indications as to a state (e.g., a measured state) of one or more components and/or conditions within an electrical power generation and delivery system may be important to communicate relatively contemporaneous with a data state change event.

Disclosed herein are various systems and methods that may improve the transmission of data over low-bandwidth communication channels in an electric power delivery system. Systems and methods disclosed herein may allow for communication between one or more stations (e.g., substations and/or sets of IEDs, monitored equipment, and/or network devices) of an electric power generation and delivery system that implement a variety of communication protocols. Devices communicating across a low-bandwidth communication channel may implement several approaches, according to various embodiments disclosed herein, to reduce the data transmitted across the low-bandwidth communication channel and to prioritize the transmission of time-sensitive and/or more important information with respect to other data.

Various embodiments disclosed herein may inspect packets to be transmitted across a low-bandwidth communication channel to identify high priority data. High priority data may be time-sensitive information and, accordingly, transmission of such data may be prioritized over other data to reduce transmission latency of the higher priority data. According to some embodiments, high priority data may comprise information relating to data state change events. Embodiments utilizing GOOSE may categorize a Boolean payload (e.g., "Permission", "Block", "Direct Trip", etc.) as high priority data. Lower priority data may comprise static data (e.g., an origin MAC address, a destination MAC address, a VLAN tag, etc.). According to various embodiments, lower priority data may be encoded efficiently for transmission across the low-bandwidth communication channel. Further, according to some embodiments, static lower priority data may be selectively omitted by a transmitting device and regenerated by a receiving device. Embodiments utilizing GOOSE may categorize an analog payload, a priority tag, an Ethertype field, and a reserved field as lower priority data. In addition to GOOSE, other embodiments of the present disclosure may utilize communications protocols such as Sampled Values (SV), Manufacturing Messaging Specification (MMS), SEL Fast Message (FM), and/or Mirrored Bits®.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described herein include software modules or components. A software module or component may include any type of computer instruction or computer executable code located within a memory device and/or transmitted as electronic signals over a system bus, a wired network, or a wireless network. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a memory device, which together implement the described functionality of the module. A module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory machine-readable and/or computer-readable medium having stored thereon instructions that may be used to program a computer (or other electronic device) to perform processes described herein. The medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified one-line diagram of an electric power delivery system 100 and associated IEDs 104, 106, 108, 115, and 170 consistent with certain embodiments disclosed herein. System 100 includes various substations and IEDs 104, 106, 108, 115, and 170 configured to perform various functions. System 100 is provided for illustrative purposes and does not imply any specific arrangements or functions required of any particular IED. In some embodiments, IEDs 104, 106, 108, 115, and 170 may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. Further, IEDs 104, 106, 108, 115, and 170 may be configured to communicate calculations, such as phasors (which may or may not be synchronized as synchrophasors), events, fault distances, differentials, impedances, reactances, frequency, and the like. IEDs 104, 106, 108, 115, and 170 may also communicate settings information, IED identification information, communications information, status information, alarm information, and the like. Information of the types listed above, or more generally, information about the status of monitored equipment, may be generally referred to herein as monitored system data.

In certain embodiments, IEDs 104, 106, 108, 115, and 170 may issue control instructions to the monitored equipment in order to control various aspects relating to the monitored equipment. For example, an IED (e.g., IED 106) may be in communication with a circuit breaker (e.g., breaker 152), and may be capable of sending an instruction to open and/or close the circuit breaker, thus connecting or disconnecting a portion of system 100. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device to perform a certain action, may be referred to as control instructions.

The electric power delivery system 100 illustrated in FIG. 1 may include a generation substation 111. Substation 111 may include generators 110 and 112, which are connected to a bus 118 through step-up transformers 120 and 122. Bus 118 may be connected to bus 126 in substation 119 via transmission line 124. Although the equipment in substation 111 may be monitored and/or controlled by various IEDs, only a single IED 104 is shown. IED 104 may be a transformer protection IED for transformer 120. IED 104 may receive a common time signal 186 which, as indicated below, may be distributed in system 100 using a communications network or using a universal time source, such as GPS, or the like. Utilizing a common or universal time source may ensure that IEDs have a synchronized time signal that can be used to generate time synchronized data, such as synchrophasors.

Substation 119 may include a generator 114, which may be a distributed generator, and which may be connected to bus 126 through step-up transformer 118. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further step-down transformer 144 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

A central IED 170 may be in communication with various IEDs 104, 106, 108, and 115, using a data communications network. IEDs 104, 106, 108, and 115 may be remote from central IED 170. The remote IEDs 104, 106, 108, and 115 may communicate over various media such as a direct communication from IED 106, over a wide-area communications network 162, or using network radios 172 and 174. IEDs 104, 106, 108, 115, and 170 may be communicatively linked together using a data communications network, and may further be communicatively linked to a central monitoring system, such as a supervisory control and data acquisition (SCADA) system 182, an information system (IS) 190, and/or a wide area control and situational awareness (WCSA) system 180. The data communications network among IEDs 104, 106, 108, 115, and 170 may utilize a variety of network technologies, and may comprise network devices such as modems, routers, firewalls, virtual private network servers, and the like, which are not shown in FIG. 1.

According to some embodiments, central IED 170 may be embodied as an automation controller, a communications processor, and/or an information processor. In various embodiments, central IED may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference. In certain embodiments, the automation controller 150 and/or any other system illustrated in FIG. 1 may be further communicatively coupled with one or more remote systems or IEDs including, for example, a remote SCADA system 153 and/or a remote WCSA system 151 via one or more network devices 155, 157 and/or interfaces.

The various IEDs in system 100 may obtain electric power information from monitored equipment using potential transformers (PTs) for voltage measurements (e.g., potential transformer 156), current transformers (CTs) for current measurements (e.g., current transformer 154), and the like. The PTs and CTs may include any device capable of providing outputs that can be used by the IEDs to make potential and current measurements, and may include traditional PTs and CTs, optical PTs and CTs, Rogowski coils, hall-effect sensors, and the like.

Each IED may be configured to access a common time source 186. The common time source 186 may be distributed via a communications network (using, for example, IEEE-1588 protocol, NTP protocol, or the like), or obtained locally at each IED. The common time source 186 may be a universal time, such as that delivered using global positioning system (GPS) satellites, WWVB, WWV, or the like. A common time may be used to time-synchronize measurements of the electric power system and/or in the calculation of synchrophasors. Measurements may be paired with a time stamp or time tag indicating a time at which the measurement was made. Accordingly, phasors calculated by the IEDs may include a time stamp indicating a time at which the measurement was made.

Central IED 170 may also be in communication with a number of other devices or systems. Such devices or systems may include, for example, a WCSA system 180, SCADA system 182, or local Human-Machine Interface (HMI) 187. Local HMI 187 may be used to change settings, issue control instructions, retrieve an event report, retrieve data, and the like. In some embodiments, WCSA system 180 may receive and process the time-aligned data, and may coordinate time synchronized control actions at the highest level of the electrical power generation and delivery system 100. Mass storage device 184 may store data relating to system 100 from IEDs 104, 106, 108, 115, and 170.

Central IED 170 may further include a time input, which may receive a time signal from a common time source 186. Time source 186 may also be used by central IED 170 for time stamping information and data. Time synchronization may be helpful for data organization, real-time decision-making, as well as post-event analysis. Time synchronization may further be applied to network communications. Time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a global positioning system (GPS) receiver with time decoding. In the absence of a discrete time source 188, central IED 170 may serve as a common time source by distributing a time synchronization signal.

Data communications between IEDs 104, 106, 108, 115, and 170 may occur using a variety of communication protocols, including GOOSE. Network radios 172 and 174 may be configured to exchange messages between central IED 170 and IED 115. As described above, GOOSE may perform poorly when implemented across a low-bandwidth communication channel, such as a radio communication channel. Accordingly, network radios 172 and 174 may be configured to implement systems and methods disclosed herein for improving the transmission of data across a low-bandwidth channel. According to one embodiment, network radios 172 and 174 may be configured to implement the systems and methods disclosed herein in a way that is transparent to other devices in system 100, such as central IED 170 and IED 115. In other words, network radios 172 and 174 may communicate with central IED 170 and IED 115 using the GOOSE protocol, but communication between network radios 172 and 174 may occur using an alternative communication protocol that is transparent with regard to other devices in system 100. According to other embodiments, network radios 172 and 174 may be integrated into central IED 170 and IED 115.

Information system 190 generally includes hardware and software to enable network communication, network security, user administration, Internet and intranet administration, remote network access and the like. Information system 190 may generate information about the network to maintain and sustain a reliable, quality, and secure communications network by running real-time business logic on network security events, perform network diagnostics, optimize network performance, and the like.

Figure 2:
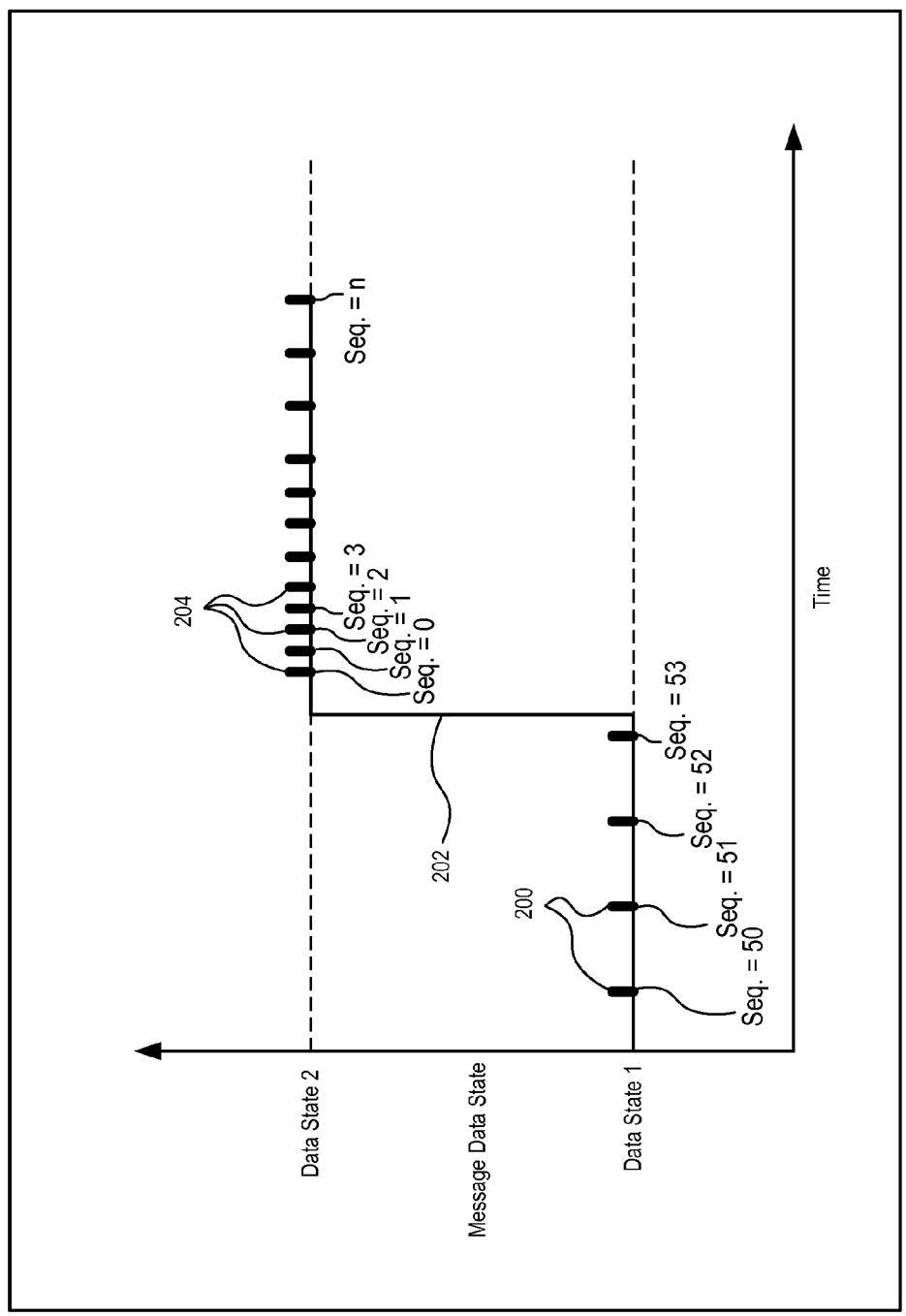
FIG. 2 illustrates a conceptual timing diagram showing transmission of messages by an IED prior to and after a data state change consistent with certain embodiments disclosed herein.

FIG. 2 illustrates a conceptual timing diagram showing transmission of messages 200 and 204 by an IED prior to and after a data state change consistent with certain embodiments disclosed herein. The messages 200 and 204 may be consistent with the GOOSE protocol. A message may include one or more control instructions, monitored system data, communications with other IEDs, monitored equipment and/or other network devices, and/or any other relevant communication, message, or data. In certain embodiments, a message may provide an indication as to a state and/or a data state (e.g., a measured state) of one or more components and/or conditions within an electrical power generation and delivery system. For example, a message may provide an indication of a measured current and/or voltage exceeding one or more thresholds. A certain state (e.g., "Data State 1") may be associated with a measurement not exceeding such a threshold, while another state (e.g., "Data State 2") may be associated with a measurement exceeding a different threshold. A message indicating a particular data state may be utilized to determine whether the measured current and/or voltage exceed the one or more thresholds. Similarly, a message may indicate a state of a component of an electric power generation and delivery system, such as a state of a breaker (e.g., "open" or "closed"), a power storage device (e.g., "charged" or "depleted"), and/or the like.

A message may further indicate not only a particular data state, but also whether the message indicates a data state that is different than a data state indicated by one or more preceding messages. That is, a message may include an indication that data associated with the message represents a data state change from a prior message. In certain embodiments, the prior message may be an immediately preceding message. Data state change information may be indicated by a data state change indicator (DSCI) included in the message. For example, a DSCI included in a message may be set to "1" following a first data state change event. According to some embodiments, the DSCI may be asserted in only a first message following a state change event. In other embodiments, the DSCI may be asserted for a specified period of time or for a specified number of messages (e.g., a message stream) following the data state change event. The DSCI may be set to a different value upon a subsequent data state change event. By utilizing a DSCI, a receiving device may determine that a particular message indicates a recent data state change without having to examine the contents (e.g., state information) of the message and/or previously received messages.

In certain embodiments, an IED may transmit to subscribing (e.g., receiving) devices and/or receive from publishing (e.g., transmitting) devices messages 200 reflecting a particular data state (e.g., "Data State 1") at periodic intervals at a first communication rate after a certain period in which the state has remained constant. For example, if a measured data state has not changed within the last 30 seconds, an IED may transmit messages 200 at periodic intervals at the first communication rate. In certain embodiments, this periodic interval may be relatively long, reflecting that a data state change has not recently occurred. Transmitting the same or similar state messages periodically in a message stream may provide a way to monitor integrity of the communications network to ensure that subscribing devices maintain network connectivity with the transmitting device. Further, the continuous transmission may serve as an indicator that the transmitting device is continuing to operate as expected. Accordingly, the continuous stream of messages may be referred to herein as a "heartbeat".

Messages comprising redundant information regarding state may be designated with incrementing sequential numbers, as illustrated in FIG. 2. As shown, messages 200 may increment their sequential numbers from 50 to 53. Following the transition from state 1 to state 2, the first message following the data state change even may have a sequential number zero, which in subsequent messages may have an incrementally higher number.

When a data state change occurs (e.g., at 202), the IED may publish and/or receive messages 204 reflecting the changed state (e.g., "Data State 2") at intervals having a second, typically variable, communication rate. As illustrated, in certain embodiments, the second communication rate may be faster than the first communication rate. Accordingly, the period between sequential messages 204 may be shorter than the period between sequential messages 200. As time progresses following the data state change event 202, the communication rate of the messages 204 may progressively slow to reach, for example, a rate at or near the first communication rate. In this manner, state messages may be transmitted at a relatively fast rate immediately following a data state change event 202 that progressively slows as the data state change event 202 becomes more remote in time. According to some embodiments, the transmission rate may decrease exponentially for a period of time following the data state change event 202.

Transmitting measured data state messages at a faster rate after a data state change event 202 may help to ensure that devices subscribing to the communications (e.g., subscribing IEDs) are more likely to receive the messages indicating the data state change as closely as possible in time to the actual data state change event 202, since GOOSE is natively a connectionless protocol. Transmitting redundant messages at a relatively fast rate, however, may introduce network congestion and/or bandwidth issues in some devices (e.g., communication switches, routers, radios, multiplexers, a real-time automation controller, IEDs, PLCs, and/or the like).

Retransmission of redundant messages may be particularly problematic in low-bandwidth channels. Accordingly, redundant messages may be omitted by a transmitting device based on the status and sequence numbers. A receiving device may regenerate the redundant messages in order to comply with the GOOSE protocol.

Figure 3:
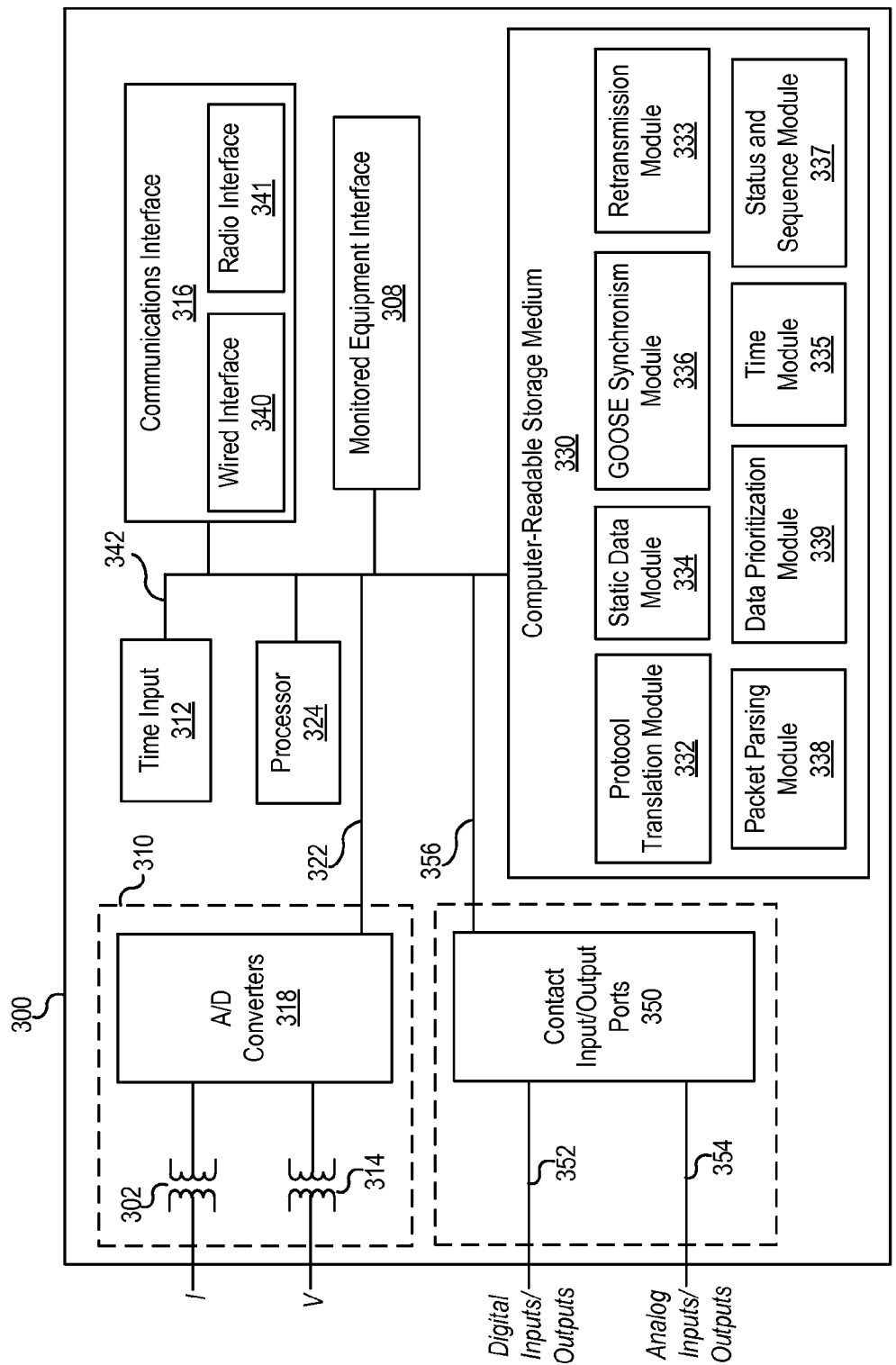
FIG. 3 illustrates a functional block diagram of an IED that may be used to improve the transmission of data over a low-bandwidth communication channel consistent with certain embodiments disclosed herein.

FIG. 3 illustrates a functional block diagram of an IED 300 that may be used to improve the transmission of data over a low-bandwidth communication channel consistent with certain embodiments disclosed herein. Although FIG. 3 illustrates an IED that may be capable of a variety of functions (e.g., collecting electric power system information, making control and/or protection decisions, implementing protection actions, etc.), according to alternative embodiments consistent with the present disclosure, devices having significantly less complexity and/or functionality may be utilized to implement systems and methods disclosed herein. For example, the functionality disclosed herein for improving transmission of data across a low-bandwidth communication channel may be implemented by a network radio, rather than a more complicated IED. IED 300 may be configured for bidirectional communication, and accordingly, may function as both a transmitting device and a receiving device.

IED 300 includes a communications interface 316 comprising a wired interface 340 and a radio interface 341. Communications interface 316 may facilitate communication with one or more networks (not shown) utilizing either wired interface 340 and/or radio interface 341. The network may be in communication with other IEDs and/or system devices, and may therefore allow IED 300 to exchange information with such devices. In certain embodiments, the wired interface 340 may facilitate direct communication with another IED or communicate with another IED via a network (not shown). IED 300 may further include a time input 312, which may be used to receive a time signal (e.g., a common or universal time reference) allowing IED 300 to include a time-stamp on communications therefrom and/or synchronize sampling with other IEDs. In certain embodiments, a common time reference may be received via network communications interface 316, and accordingly, a distinct time input 312 may not be required for time-stamping and/or synchronization operations. One such embodiment may employ the IEEE 1588 protocol. A monitored equipment interface 308 may be configured to receive status information from, and issue control instructions to, a piece of monitored equipment (such as a circuit breaker, conductor, transformer, or the like).

Processor 324 may be configured to process communications received via network communications interface 316, a sensor component 310, time input 312, and/or monitored equipment interface 308. Processor 324 may operate using any number of processing rates and architectures. Processor 324 may be configured to perform various algorithms and calculations described herein. Processor 324 may be embodied as a general purpose integrated circuit, an application specific integrated circuit, a field-programmable gate array, and/or any other suitable programmable logic device.

In certain embodiments, IED 300 may include sensor component 310, which may be configured to gather information relating to waveforms associated with an electric power delivery system. In the illustrated embodiment, sensor component 310 is configured to gather data directly from a conductor (not shown) and may use, for example, transformers 302 and 314 and A/D converters 318 to sample and/or digitize filtered waveforms to form corresponding digitized current and voltage signals, which are provided to bus 322. A/D converters 318 may include a single A/D converter or separate A/D converters for each incoming signal. A current signal may include separate current signals from each phase of a three-phase electric power system. A/D converters 318 may be connected to processor 324 by way of bus 322, through which digitized representations of current and voltage signals may be transmitted to processor 324. In various embodiments, the digitized current and voltage signals received via sensor component 310 may be processed and stored on computer-readable storage medium 330 and/or transferred via communications interface 316 to an external mass storage device.

In some embodiments, IED 300 may also include contact input/output ports 350. Contact input/output ports may comprise digital inputs/outputs 352 and/or analog inputs/outputs 354. Contact input/output ports 350 may permit direct communication with a variety of devices, such as trip sensors, intrusion systems, general failure alarms, etc., that provide binary information (e.g., open/closed, trip/no trip, alarm/no alarm). In addition to receiving binary signals, other types of data may also be received or transmitted via contact input/output ports 350. For example, a temperature sensor may be connected to contact input/output ports 350 and may provide an indication of a temperature in a particular location. Further, contact input/output ports 350 may be associated with devices that are selectively enabled or disabled using contact input/output ports 350.

According to some embodiments, a device that does not communicate according to the GOOSE protocol may be directly connected to IED 300. IED 300 may generate a GOOSE message encapsulating the data generated by the non-GOOSE enabled device. For example, an intrusion sensor may be directly coupled to one of digital inputs/outputs 352 and/or analog inputs/outputs 354. When the intrusion sensor is triggered (e.g., by detecting that a door has been opened), a binary signal may be generated. The binary signal may be converted by IED 300 into a GOOSE message that may be transmitted by either wired interface 340 or radio interface 341.

A non-transitory computer-readable storage medium 330 may be the repository of various software modules configured to perform any of the methods described herein. A data bus 342 may link monitored equipment interface 308, time input 312, network communications interface 316, and computer-readable storage medium 330 to processor 324.

Protocol translation module 332 may be configured to allow IED 300 to communicate with any of a variety of external devices via network communications interface 316. Protocol translation module 332 may be configured to communicate using a variety of data communication protocols (e.g., TCP/IP, IEC 61850, etc.). Further, protocol translation module 332 may be configured to translate data from one communications protocol to another communications protocol in order to improve bandwidth utilization and/or decrease communication latency associated with certain higher priority data. According to some embodiments, protocol translation module 332 may be configured to generate a message stream based upon signals received via contact input/output ports 350. As described above, such signals may be analog signals and/or digital signals. Such signals may be converted into a data protocol suitable for transmission via wired interface 340 and/or radio interface 341.

Static data module 334 may be configured to optimize the transmission of static data across a low-bandwidth communication channel. Various communication protocols, including standard communication protocols and proprietary communication protocols may be utilized in various embodiments consistent with the present disclosure. Examples of static data in a network utilizing the GOOSE protocol may include origin and destination MAC addresses, VLAN and priority tags, Ethertype, and reserved fields. Static data may, according to some embodiments, be stripped by a transmitting device and re-created by a receiving device. For example, a network radio transmission system may incorporate a data integrity code. Accordingly, cyclical redundancy check (CRC) included with an Ethernet encapsulated GOOSE message may be redundant since corruption in the data may be detected using the network radio transmission system's data integrity code. The CRC may therefore be removed by a transmitting device and regenerated by a receiving device, according to certain embodiments consistent with the present disclosure.

GOOSE synchronism module 336 may maintain a replica at a receiving device, such as IED 300, of the static data of a given GOOSE publisher to which the receiver subscribes. Examples of this data include origin and destination MAC addresses, VLAN and priority tags, Ethertype and reserved fields. As described above, the static data module 334 may omit from communication certain types of static data. In a receiving device, GOOSE synchronism module 336 may operate in conjunction with static data module 334 in a transmitting device to replicate a GOOSE message stream from the transmitting device.

As discussed above, GOOSE messages may also incorporate a plurality of redundant messages, each of which may be designated by a state and a sequential number. In order to reduce the bandwidth utilization associated with a GOOSE system, retransmission module 333 may be configured to omit redundant messages based on status and sequence numbers in a message stream. According to some embodiments, an acknowledgment system may be implemented across the low-bandwidth channel in order to ensure that a message relating to a change of state has been successfully transmitted and received.

The retransmission pattern of redundant messages is not standardized in the GOOSE protocol. Therefore, a receiving device, such as IED 300, may follow at least one of three approaches: (1) mimic the retransmit rate used by the transmitting device by generating redundant messages based upon an abbreviated representation of a redundant message; (2) retransmit based on "time to live" parameters included in the GOOSE message stream meaning the data item in the GOOSE message itself that informs the receiving device about the maximum time a new message is to be originated even if no new state occurs; (3) retransmit using a proprietary pattern. Each GOOSE message contains a "time to live" field, which informs the receiving device of the time that the next message is to be sent. Accordingly, the receiving device may determine when the next packet is expected to arrive. Certain embodiments may utilize the first approach because it makes the conversion from GOOSE to a more efficient protocol for transmission across the low-bandwidth channel transparent; however, this approach may also have greater complexity when compared with the other two alternatives. According to other embodiments, a system may send the redundant messages using an optimized encoding for retransmission of redundant data. Any of the three above-described approaches may be implemented by retransmission module 333.

Figure 5:
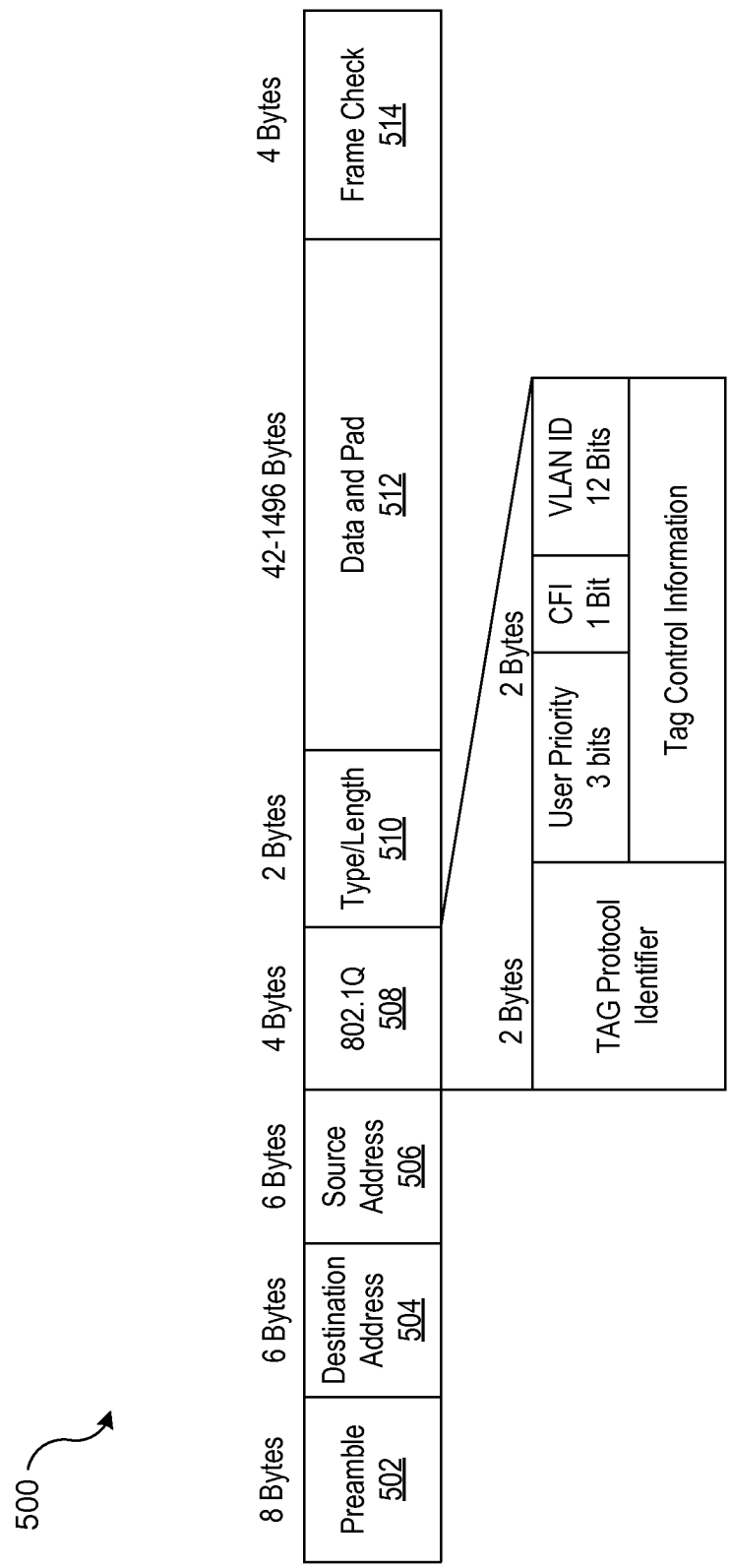
FIG. 5 illustrates a block diagram of an Ethernet frame that may encapsulate a GOOSE data packet consistent with certain embodiments disclosed herein.

Packet parsing module 338 may be configured to parse each message in a stream of data packets and to identify higher priority data and lower priority data contained within each data packet. Higher priority data may be transmitted as expeditiously as possible in order to minimize the latency associated with such data. According to various transmission protocols, a data packet may comprise several types of data. These parts of the message may have different character, purpose and user application. In order to limit the bandwidth requirements and minimize transmission latency, these parts may be identified and treated appropriately. A specific example illustrated a block diagram of an Ethernet frame encapsulating a GOOSE data packet consistent with certain embodiments disclosed herein is illustrated in FIG. 5. As shown in FIG. 5, an Ethernet frame, for example, may comprise MAC addresses and other identifiers of the GOOSE publisher, sequence numbers, a Boolean payload, and an analog payload. MAC addresses and other identifiers of the GOOSE publisher may be categorized as lower priority (or even static) data, and may be replaced by a simple and efficient identifier (e.g., an abbreviated representation) of a given GOOSE message to which the transmitting device subscribes. This data may be transmitted periodically at a relatively low rate, according to certain embodiments. In contrast, the Boolean payload of a GOOSE Ethernet frame may be treated as higher priority data, and may be transmitted immediately upon receipt (e.g., in real-time or as near to real-time as possible).

Returning to a discussion of FIG. 3, data prioritization module 339 may operate in conjunction with packet parsing module 338 in order to prioritize the transmission of higher priority data. Data prioritization module 339 may be configured to minimize the latency associated with higher priority data. Similarly, lower priority data may be transmitted as capacity becomes available in the low-bandwidth communication channel.

Time module 335 may be configured to encode time information (e.g., a timestamp associated with a message) as efficiently as possible. Further, time module 335 may rely on an assumption that time will drift slowly between a transmitting device and a receiving device. This assumption is especially true in embodiments in which each transmitting device and each receiving device receive a common time signal (e.g., a time signal from the GPS system). According to one embodiment, the time information may be transmitted according to a fixed schedule or availability of capacity in the low-bandwidth communication channel in order to limit drift between a transmitting device and a receiving device. According to another embodiment, a relatively short data value may represent an increment of time elapsed from a previously transmitted time value.

As described above, status and sequence identifiers may be associated with a plurality of redundant packets transmitted according to the GOOSE protocol. In order to conserve bandwidth, status and sequence identifiers may be generated or incremented by that receiving device. Similar to a time stamp included by time module 335, an abbreviated representation of the status and/or sequence identifiers may be exchanged frequently, while the full values of the sequence and status numbers are synchronized using a reduced transmission rate.

Status and sequence module 337 may be configured to generate or increment at a receiving device status and sequence numbers associated with a message stream. Similar to the approach described above in connection with time stamp module 335, an abbreviated representation of a status number or a sequence number may be exchanged, while the full values of the sequence and status numbers may be synchronized only periodically or as capacity becomes available in the low-bandwidth communication channel.

Figure 4:
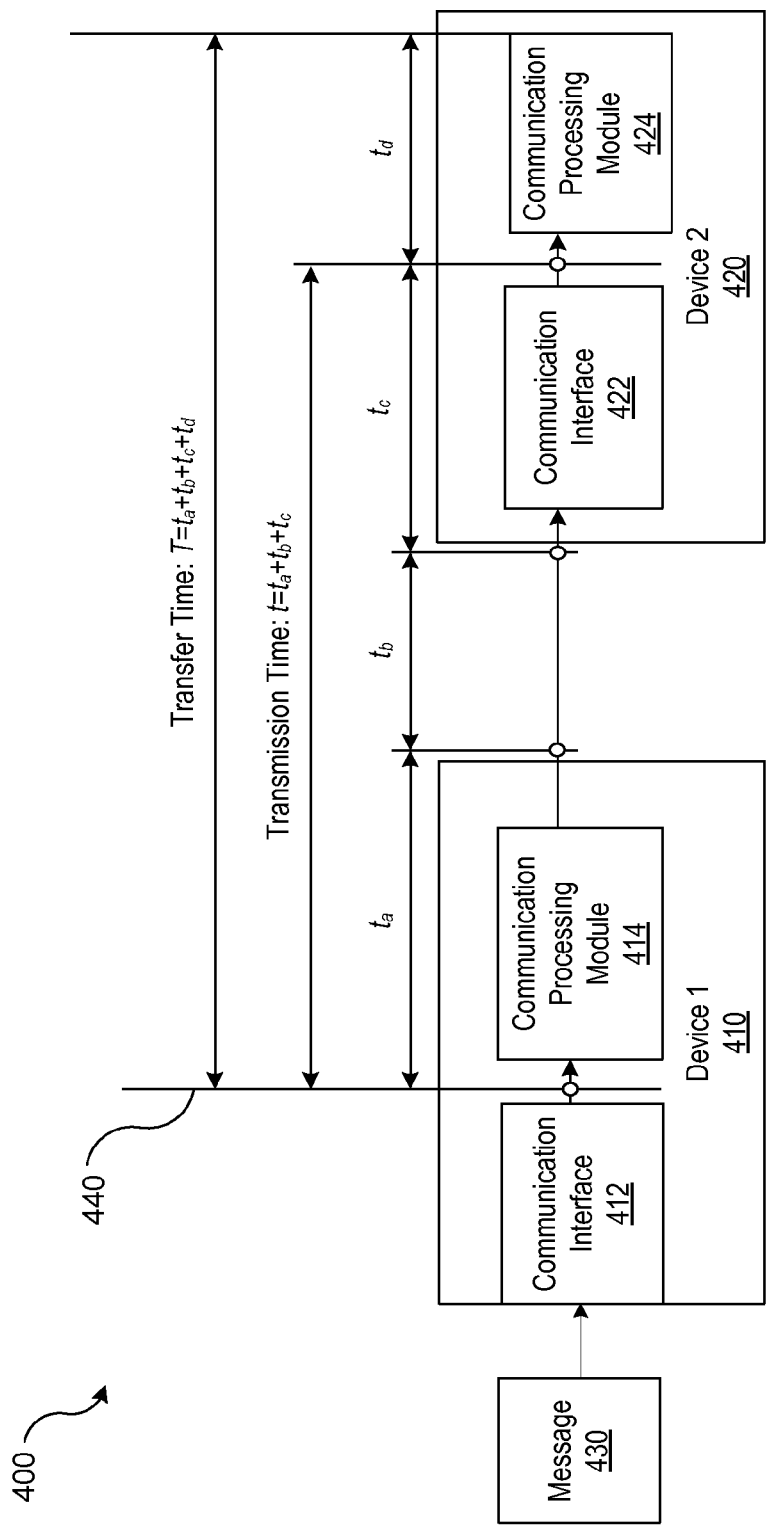
FIG. 4 illustrates a block diagram of a data transmission system and the calculation of transfer time of a message and a transmission time of a message between a first device and a second device consistent with certain embodiments disclosed herein.

FIG. 4 illustrates a block diagram of a data transmission system 400 and the calculation of a transfer time of a message 430 and a transmission time of the message 430 between a first device 410 and a second device 420 consistent with certain embodiments disclosed herein. As illustrated, the first device 410 comprises a communications interface 412 and a communication processing module 414. Similarly, the second device 420 comprises a communication interface 422 and a communication processing module 424. A message 430 is to be transmitted from the first device 410 to the second device 420.

Calculation of the transfer time begins at 440, after message 430 has been received via communication interface 412 and made available to communication processing module 414. Communication processing module 414 may translate message 430 into an alternative protocol for transmission. For example, communication processing module 414 may convert message 430 from a GOOSE format to an alternative format for transmission to the second device 420. The time between point 440, and the time that message 430 is transmitted by the first device 410 may be referred to as $t_a$. The transmission time between the first device 410 and the second device 420 may be referred to as $t_b$. Message 430 may arrive at communications interface 422, and after a period of time $t_c$ may be made available to communication processing module 424. The sum of $t_a$, $t_b$, and $t_c$ may be referred to as a transmission time. A transfer time may include an additional time period, $t_d$, associated with the processing of message 430 by communication processing module 424. The sum of $t_a$, $t_b$, $t_c$, and $t_d$ may be referred to as a transfer time.

The systems and methods disclosed herein are aimed at reducing the $t_b$ time by considerably reducing the amount of data to be actually sent for time sensitive messages. This in turn may result in increased computational demands associated with communication processing module 414 and 424. In other words, the scarce resource of communications channel bandwidth is traded for computational resources within the IEDs that may be scaled up as much as required to implement the embodiments.

FIG. 5 illustrates a block diagram of an Ethernet frame 500 that may encapsulate a GOOSE data packet consistent with certain embodiments disclosed herein. The frame starts with a preamble 502, which may provide a synchronization of the frame reception portions of receiving physical layers with the incoming bit stream. A destination MAC address 504 may identify the destination, and a source MAC address 506 may identify the sender. A link layer control field 508, which according to the illustrated embodiment operates according to the 802.1Q standard, may control data traffic between devices sharing the same transmission medium. A type/length field 510 may comprise a code indicating a protocol type according to which data and pad field 512 may be formatted. Where a transmitting and receiving station are communicating using GOOSE, this value may be specified as an Ethertype value of 88-B8 (hexadecimal format). Data and pad 512 comprise the data to be transmitted. Data and pad 512 may comprise a sequence of n bytes, where in some embodiments $42 \leq n \leq 1496$ bytes. In certain embodiments, the total frame minimum may be 64 bytes, and the pad may contain extra data bytes, if necessary, to bring the frame length up to its minimum size.

As described above, several of the fields of Ethernet frame 500 may comprise static data for redundant data that may be transmitted more efficiently by using abbreviated coding. As described above, the destination address 504, source address 506, and type/length 510 may be omitted entirely, or may be replaced by a more efficient coding according to various embodiments. Similarly, frame check 514 may be omitted in view of data verification mechanisms provided by network radio systems. Further reductions may be realized by more efficiently coding sequential numbers and time values embedded within the data and pad field 512.

Figure 6:
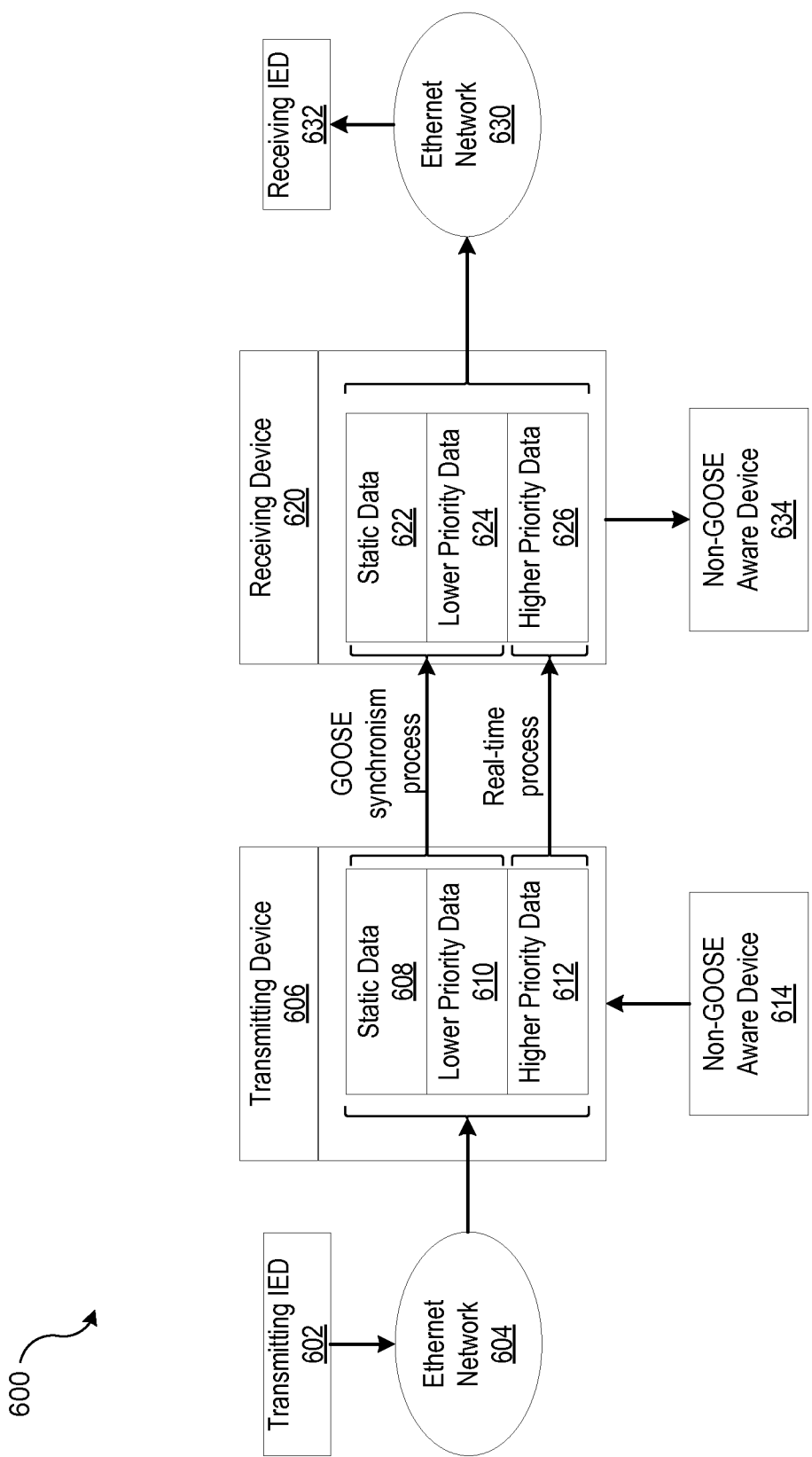
FIG. 6 illustrates a functional block diagram of a system including a transmitting IED, a transmitting device, a receiving device, and a receiving IED consistent with embodiments disclosed herein.

FIG. 6 illustrates a functional block diagram of a system 600 that includes a transmitting IED 602, a transmitting device 606, a receiving device 620, and a receiving IED 632 consistent with embodiments disclosed herein. As illustrated, transmitting IED 602 and transmitting device 606 may be connected via an Ethernet network 604. Transmitting device 606 may comprise a radio transmission system. Transmitting device 606 may, according to some embodiments, further comprise systems for receiving information from and/or providing information to non-GOOSE aware devices. A receiving device 620 and receiving IED 632 may be connected by an Ethernet network 630. Similarly, receiving device 620 may be configured to communicate with certain non-GOOSE aware devices. Each of transmitting device 606 and receiving device 620 may comprise a sub-set of the components described above in connection with FIG. 3. Returning to a discussion of FIG. 6, according to various embodiments consistent with the present disclosure, transmitting IED 602 may generate a stream of messages for transmission to receiving IED 632. The stream of messages may be created according to a first communications protocol, namely GOOSE. The stream of messages may be transmitted via Ethernet network 604 to transmitting device 606.

Transmitting device 606 may parse the incoming stream of messages to identify higher priority data 612, lower priority data 610, and static data 608. Transmitting device 606 may translate the incoming data stream into a second communications protocol in which the higher priority data 612 is prioritized over the lower priority data 610 and the static data 608. The second communications protocol may further improve the efficiency of the encoding associated with any of higher priority data 612, lower priority data 610, and/or static data 608 utilizing various techniques disclosed herein. The second communications protocol may comprise a proprietary communications protocol or a generic communications protocol optimized for transmission of data across a low-bandwidth communication channel.

Higher priority data 612 may be transmitted to receiving device 620 using a real-time, or near-real time process. The real-time process may help to minimize the transfer time associated with the transmission of higher priority data, which may include time-sensitive information. Lower priority data 610 and static data 608 may be transmitted from transmitting device 602 receiving device 620 using a GOOSE synchronism process, which is described above, in connection with FIG. 3. As also described above, the GOOSE synchronism process may be responsible for generating a plurality of redundant messages constituting a "heartbeat" signal. According to some embodiments, the "heartbeat" signal may be based upon an abbreviated representation of a sequence number transmitted in the second message stream. The complete sequence number may also be periodically transmitted in the second message stream. In addition, one or more time stamps in the first data stream may be converted to an abbreviated representation for transmission between transmitting device 606 and receiving device 620 in the second message stream.

Receiving device 620 may generate a third message stream by translating the second message stream into the first communications protocol (e.g., GOOSE). The third message stream may include higher priority data 626, lower priority data 624, and static data 622. According to some embodiments, the first message stream may differ from the third message stream due to the prioritization of higher priority data. According to some embodiments, individual data packets may be altered in the transmission process from transmitting IED 602 to receiving IED 632, although the communications protocol is the same. In other words, the first message stream and the third message stream may comprise a plurality of distinct packets.

According to some embodiments, a non-GOOSE aware device 614 may be in communication with transmitting device 606. Non-GOOSE aware device 614 may comprise a trip sensor, an intrusion sensor, general failure alarm, a temperature sensor, and the like. Similarly, a non-GOOSE aware device 634 may be in communication with receiving device 620. A signal may be generated by non-GOOSE aware device 614 that is transmitted to transmitting device 606. For example, non-GOOSE aware device 614 may comprise an intrusion sensor that generates an alarm signal when a door is opened. The alarm signal may be transmitted to transmitting device 606, which may in turn create a GOOSE message encapsulating an indication that an alarm signal has been generated by non-GOOSE aware device 614.

A GOOSE message encapsulating data received from non-GOOSE aware device 614 may be transmitted to receiving device 620, which may determine what action should be taken based upon the data transmitted by non-GOOSE aware device 614. The data may be transmitted to Ethernet network 630 and receiving IED 632, and/or the data may be routed to non-GOOSE aware device 634. Continuing the example discussed above relating to an alarm signal generated by non-GOOSE aware device 614, non-GOOSE aware device 634 may comprise an audible alarm configured to sound when an intrusion is detected. Accordingly, receiving device 620 may generate a non-GOOSE signal based upon the GOOSE message encapsulating data received from non-GOOSE aware device 614 and transmit the non-GOOSE signal to non-GOOSE aware device 634. The non-GOOSE signal may comprise, for example, an enable or activate signal that causes an audible alarm to sound. According to this example, data may be generated by non-GOOSE aware device 614 that is consumed by non-GOOSE aware device 634. Accordingly, system 600 may facilitate direct communication between non-GOOSE aware devices 614 and 634 using GOOSE without the interaction of transmitting IED 602 and receiving IED 632.

Figure 7:
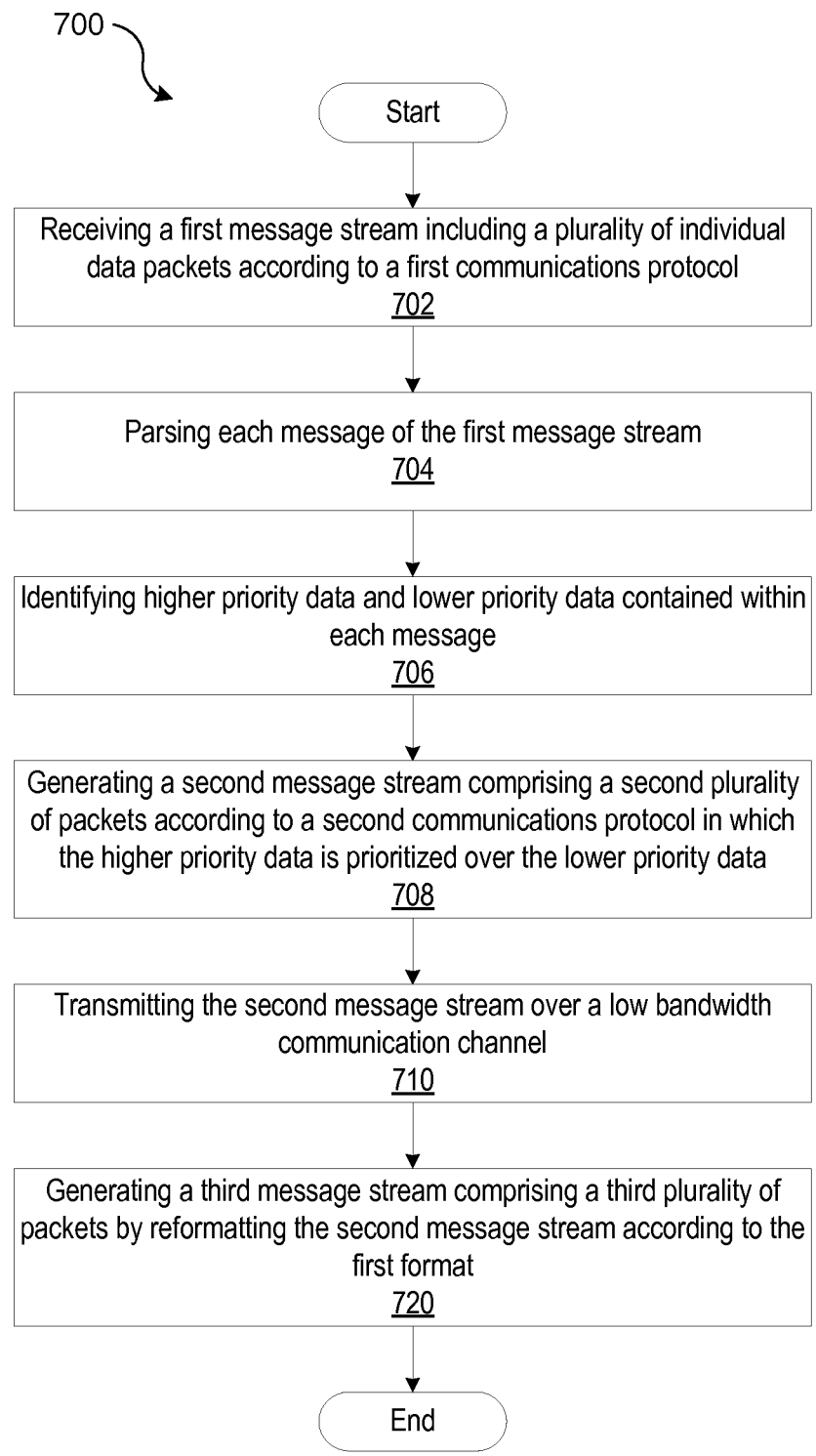
FIG. 7 illustrates a flow chart of a method for transmitting a stream of messages over a low-bandwidth communication channel between stations in an electric power delivery system consistent with certain embodiments disclosed herein.

FIG. 7 illustrates a flow chart of a method 700 for transmitting a stream of messages over a low-bandwidth communication channel between stations in an electric power delivery system consistent with embodiments disclosed herein. Method 700 may be implemented by a transmission device and a receiving device configured to communicate according to a first communication protocol. Method 700 may begin by receiving a first message stream including a plurality of actual data packets according to the first communication protocol, at 702. Each message of the first message stream may be parsed, at 704, in order to identify higher priority data and lower priority data contained within each message, at 706.

A second stream of data may be generated that includes a second plurality of packets according to a second communications protocol at the higher priority data is prioritized over the lower priority data, at 708. The second stream of messages may be transmitted over a low-bandwidth communication channel, at 710. A receiving device may generate a third message stream comprising a third plurality of packets by reformatting the second message stream according to the first format, at 720.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system configured to transmit a stream of message over a communication channel in an electric power delivery system, the system comprising:
   a communications interface configured to receive a first message stream according to the first communications protocol, the message stream comprising a first plurality of individual data packets;
   a packet parsing system configured to parse each message of the first message stream and to identify higher priority data and lower priority data contained within each data packet; and
   a protocol translation system configured to generate a second message stream comprising a second plurality of packets according to a second format in which higher priority data is prioritized over the lower priority data;
   wherein the second message stream is transmitted over the communication channel via the communications interface.

2. The system of claim 1, wherein the communications interface comprises a radio transmitter configured to transmit the second message stream.

3. The system of claim 1, further comprising a static data module configured to identify a static data value comprised within the first message stream and to generate an abbreviated representation of static data to be transmitted in the second message stream.

4. The system of claim 1, further comprising a time module configured to identify a time stamp comprised within the first message stream and to generate an abbreviated representation of the time stamp to be transmitted in the second message stream.

5. The system of claim 4, wherein the abbreviated representation comprises an increment of time elapsed from a previously transmitted time value.

6. The system of claim 1, wherein the second plurality of packets second message stream is ordered to reduce transmission latency of the higher priority data.

7. The system of claim 1, wherein the first communications protocol comprises GOOSE protocol.

8. The system of claim 7, wherein the higher priority data comprises a Boolean payload.

9. The system of claim 7, wherein the higher priority data comprises an indication of a data state change.

10. The system of claim 9, wherein the lower priority data comprises one of an analog payload, an origin MAC address, a destination MAC address, a VLAN tag, and a priority tag, an Ethertype field, and a reserved field.

11. The system of claim 1, wherein the first communications interface comprises a first communication port and a second communication port, the first communication port configured to receive the first message stream, and the second communication port configured to transmit the second message stream.

12. The system of claim 11, wherein the second communication port comprises a network radio.

13. The system of claim 12, wherein the system further comprises one of an analog contact input/output port and a binary contact input/output port.

14. The system of claim 13, wherein the protocol translation system is further configured to receive a signal via one of the analog contact input/out port and the binary contact input/output port and to insert into the second message stream at least one packet representing the signal.

15. A system configured to transmit a stream of message over a communication channel between stations in an electric power delivery system, comprising:
   a first device configured to communicate according to a first protocol and a second protocol, the first device comprising:
      a first communications interface configured to receive a first message stream according to the first communications protocol, the message stream comprising a first plurality of individual data packets;

a first packet parsing system configured to parse each message of the first message stream and to identify higher priority data and lower priority data contained within each data packet;

a first protocol translation system configured to generate a second message stream comprising a second plurality of packets according to a second format in which higher priority data is prioritized over the lower priority data;

wherein the second message stream is transmitted over the communication channel via the first communications interface;

a second device configured to communicate according to the first protocol and the second protocol, the second device comprising:

a second communications interface configured to receive the second message stream; and a second protocol translation system configured to generate a third message stream comprising a third plurality of packets by reformatting the second message stream according to the first protocol.

* * * * *